US011426831B2

(12) United States Patent
Hayashi et al.

(10) Patent No.: US 11,426,831 B2
(45) Date of Patent: Aug. 30, 2022

(54) COOLING LIQUID FEEDER (71) Applicant: OKUMA Corporation, Aichi (JP)

(72) Inventors: Tomoki Hayashi, Aichi (JP); Shoichi Morimura, Aichi (JP)

(73) Assignee: OKUMA CORPORATION, Aichi (JP)

(*) Notice: Subject to any disclaimer, the term of this patent is extended or adjusted under 35 U.S.C. 154(b) by 91 days.

(21) Appl. No.: 16/653,395

(22) Filed: Oct. 15, 2019

(65) Prior Publication Data

US 2020/0114482 A1 Apr. 16, 2020

(30) Foreign Application Priority Data

Oct. 15, 2018 (JP) .............................. JP2018-194643

(51) Int. Cl.
*B23Q 11/10* (2006.01)

(52) U.S. Cl.
CPC .......... *B23Q 11/10* (2013.01); *B23Q 11/1084* (2013.01)

(58) Field of Classification Search
CPC . B23Q 11/1076; B23Q 11/1092; B23Q 11/10; B25J 11/0055; B25J 11/005; B25J 11/006
See application file for complete search history.

(56) References Cited

U.S. PATENT DOCUMENTS

| | | | | |
|---|---|---|---|---|
| 5,186,394 A * | 2/1993 | Tsuji | .................. | B21B 45/0233 239/587.4 |
| 5,509,335 A * | 4/1996 | Emerson | ............ | B23Q 11/1053 409/136 |
| 6,640,678 B2 * | 11/2003 | Kumano | ................. | B23B 3/167 82/117 |
| 2002/0146297 A1 * | 10/2002 | Curtis | ................ | B23Q 11/1084 409/132 |
| 2012/0186053 A1 * | 7/2012 | Meidar | .................... | B23Q 5/04 29/39 |
| 2012/0308323 A1 * | 12/2012 | Gardner | ............ | B23Q 11/1076 409/84 |
| 2016/0184951 A1 | 6/2016 | Kurokawa | | |

(Continued)

FOREIGN PATENT DOCUMENTS

| | | | |
|---|---|---|---|
| JP | H08126936 A | | 5/1996 |
| JP | 10118884 A | * | 5/1998 |

(Continued)

OTHER PUBLICATIONS

JPO Notice of Reasons for Refusal for corresponding JP Application No. 2018-194643; dated Jun. 21, 2022.

*Primary Examiner* — Ryan Rufo
(74) *Attorney, Agent, or Firm* — Cantor Colburn LLP (57) ABSTRACT

A cooling liquid feeder for feeding a cooling liquid into a cooling liquid hole defined in a tool includes a first connector disposed on a turret which retains the tool, a first flow channel for directing the cooling liquid from the first connector to the cooling liquid hole, a robot installed in a machining chamber and equipped with an end effector, a second connector disposed on the end effector and configured to be detachably attached to the first connector in a liquid tight manner, and a second flow channel for directing the cooling liquid from a source of the cooling liquid to the second connector, in which the robot is actuated to attach the second connector to the first connector for feeding the cooling liquid into the cooling liquid hole.

3 Claims, 7 Drawing Sheets

(56) References Cited

U.S. PATENT DOCUMENTS

| | | | |
|---|---|---|---|
| 2016/0193663 A1 | 7/2016 | Okuno et al. | |
| 2016/0193669 A1* | 7/2016 | Chen .................... | B23Q 39/023 409/203 |
| 2016/0236351 A1 | 8/2016 | Kunihiro | |
| 2016/0243661 A1 | 8/2016 | Watanabe | |
| 2017/0157728 A1* | 6/2017 | Lai ....................... | B23Q 1/0027 |
| 2017/0326700 A1* | 11/2017 | Morimura .......... | B23Q 11/0075 |
| 2017/0341196 A1 | 11/2017 | Nakamura | |
| 2018/0056465 A1 | 3/2018 | Koshiishi | |

FOREIGN PATENT DOCUMENTS

| | | | |
|---|---|---|---|
| JP | 2001212735 A | * | 8/2001 |
| JP | 2004223635 A | | 8/2004 |
| JP | 2005246486 A | | 9/2005 |
| JP | 2016124046 A | | 7/2016 |
| JP | 2016150399 A | | 8/2016 |
| JP | 2016153149 A | | 8/2016 |
| JP | 2017209747 A | | 11/2017 |
| JP | 2018034232 A | | 3/2018 |

\* cited by examiner

COOLING LIQUID FEEDER

CROSS REFERENCE TO RELATED APPLICATION

This application claims priority to Japanese Patent Application No. 2018-194643 filed on Oct. 15, 2018, which is incorporated herein by reference in its entirety including the specification, claims, drawings, and abstract.

TECHNICAL FIELD

This specification discloses a cooling liquid feeder configured to feed a cooling liquid into a cooling liquid hole formed in a tool.

BACKGROUND

In machine tools, such as lathes and machining centers, a tool is used for cutting a workpiece. Such a machine tool is equipped with a tool-retaining device for retaining tools. The tool-retaining device is a turret or a tool post in a turret lathe, or a tool spindle device in a machining center.

Typically, during operation to machine a workpiece, a cooling liquid (which is also referred to as a coolant or a cutting fluid) is ejected in the vicinity of a machining point. The machine tools are equipped with an ejection nozzle for ejecting the cooling liquid. Patent Documents 1 and 2 (JP 2018-34232 A and JP 2016-124046 A) disclose that a robot is installed inside a machining chamber of a machine tool, and an ejection nozzle is disposed on the robot. Meanwhile, Patent Document 3 (JP 2016-150399 A) discloses a technique in which an ejection nozzle is installed at a position separated from a robot, and a tip end position of the ejection nozzle is moved by means of the robot. In this technique, the tip end position of the ejection nozzle can be changed by means of the robot, which can ensure that the cooling liquid is reliably poured onto the machining point.

CITATION LIST

Patent Literature

Patent Document 1: JP 2018-34232 A
Patent Document 2: JP 2016-124046 A
Patent Document 3: JP 2016-150399 A Recently, it has been suggested that a cooling liquid hole is formed in the inside of a tool, and a cooling liquid is fed into the cooling liquid hole, for the purposes of increasing a service life of the tool, enhancing stability of accuracy, and the like. One end of the cooling liquid hole is communicated with an inner flow channel defined in a tool-retaining device, and the other end of the cooling liquid hole is extended to a position close to a tip end of the tool and communicated with the outside of the tool. Because the cooling liquid is fed through the inner flow channel into the cooling liquid hole, to thereby effectively cool the tool, the service life of the tool and accuracy in machining are improved. In addition, the cooling liquid flowing through the tool is subsequently discharged from the other end of the cooling liquid hole to the outside, and poured onto a workpiece, which can also cause the workpiece to be cooled.

Here, in order to use the tool having the cooling liquid hole, the tool-retaining device must have, on its inside, the inner flow channel communicated with a source of the cooling liquid. However, formation of the inner flow channel makes the structure of the tool-retaining device complicated, and causes upsizing of the tool-retaining device. With this in view, the present specification discloses a cooling liquid feeder capable of feeding a cooling liquid into a cooling liquid hole in a tool, without having to form an inner flow channel communicating with a source of the cooling liquid.

SUMMARY

In an aspect, a cooling liquid feeder disclosed herein is a device for feeding a cooling liquid into a cooling liquid hole defined in a tool, and includes a first connector disposed on the tool, a tool holder, or a tool-retaining device for retaining the tool, a first flow channel defined to direct the cooling liquid from the first connector into the cooling liquid hole, a robot installed in a machining chamber and equipped with an end effector, a second connector disposed on either a main body of the robot or the end effector and configured to be attachable and detachable to and from the first connecter in a liquid tight manner, and a second flow channel defined to direct the cooling liquid from a source of the cooling liquid to the second connector. In the cooling liquid feeder, the robot is actuated to attach the second connector to the first connector for feeding the cooling liquid into the cooling liquid hole.

When configured as described above, the cooling liquid can be fed into the cooling liquid hole in the tool without requiring formation of an inner flow channel which is extended to communicate with the source of the cooling liquid.

In an aspect, the cooling liquid feeder may further include a controller configured to control actuation of the robot, and the controller may control the actuation of the robot in such a manner that the robot causes the second connector to move following movement of the tool.

The above-described configuration can prevent unintentional separation between the second connector and the first connector.

In an aspect, the robot may be installed on the tool-retaining device, and may be moved together with the tool-retaining device.

The above-described configuration can facilitate moving the second connector so as to follow movement of the tool.

In an aspect, the first connector may be disposed on the tool or the tool holder, and the first flow channel is defined without passing through the tool-retaining device.

When configured as described above, because there is no need to form any flow channel in the tool-retaining device, the cooling liquid can be fed into the cooling liquid hole even in an existing machine tool.

In an aspect, two or more tool-retaining devices may be installed, and two or more sets of the first connector, the second connector, the first flow channel, and the second flow channel may be provided for allowing the cooling liquid to be simultaneously fed into cooling liquid holes of two or more tools retained by different ones of the two or more tool-retaining devices.

When configured as described above, the cooling liquid holes in the two or more tools retained by the different tool-retaining devices can be fed with the cooling liquid at the same time.

According to the cooling liquid feeder disclosed in this specification, it becomes possible to feed the cooling liquid into the cooling liquid hole of the tool, without having to form, inside the tool-retaining device, any inner flow channel extended to communicate with the source of the cooling liquid.

BRIEF DESCRIPTION OF DRAWINGS

Embodiments of the present disclosure will be described based on the following figures, wherein.

DESCRIPTION OF EMBODIMENTS

Figure 1:
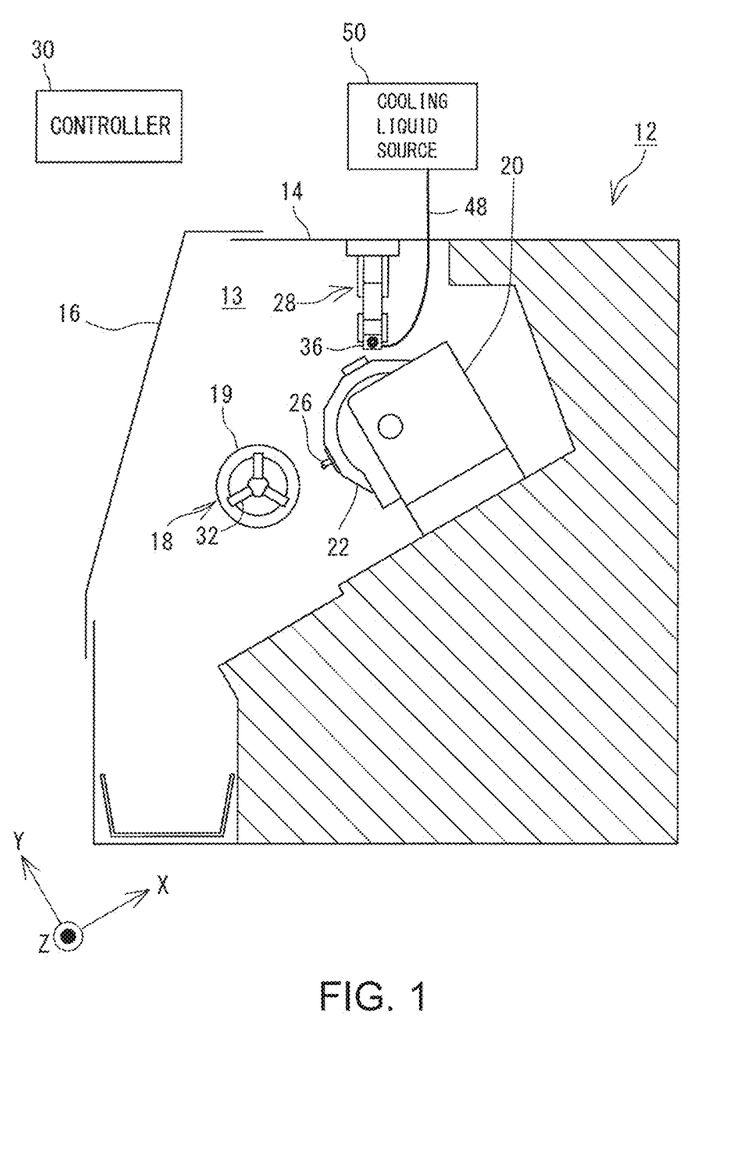
FIG. 1 is a general side view of a machine tool incorporating a cooling liquid feeder.
Figure 2:
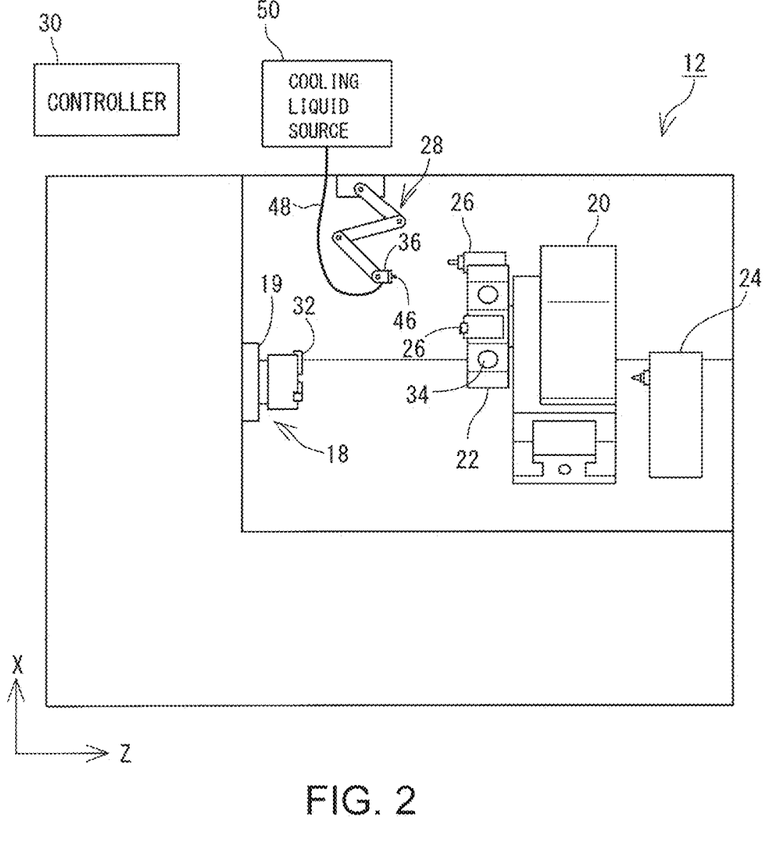
FIG. 2 is a general front view of the machine tool depicted in FIG. 1.

Hereinafter, a configuration of a cooling liquid feeder will be described with reference to the drawings. FIG. 1 is a general side view of a machine tool 12 in which the cooling liquid feeder is installed, and FIG. 2 is a general front view of the machine tool 12. In the following description, a direction parallel to a rotation axis of a spindle is referred to as a Z axis, a direction parallel to a travel direction of a tool post 20, the travel direction being orthogonal to the Z axis is referred to as an X axis, and a direction orthogonal to both the X axis and the Z axis is referred to as a Y axis.

The machine tool 12 is a lathe in which a tool 26 retained by the tool post 20 is brought into contact with a rotating raw workpiece (which is not illustrated in FIG. 1 or FIG. 2), to thereby machine the rotating raw workpiece. More specifically, the machine tool 12 is a turning center which is configured to be NC controlled, and includes a turret 22 for retaining a plurality of tools 26.

The periphery of a machining chamber 13 of the machine tool 12 is enclosed by a cover 14. A large opening is formed on a front surface of the machining chamber 13, and the large opening is opened and closed by a door 16. An operator is able to access, through the opening, each component within the machining chamber 13. During machining operation, the door 16 provided to the opening is closed. This is intended to ensure safety, secure environments, and meet other issues.

The machine tool 12 includes a spindle device 18 which rotatably holds one end of a raw workpiece, the tool post 20 which retains the tool 26, and a tail stock 24 (not illustrated in FIG. 1, but shown in FIG. 2) which supports the other end of the raw workpiece. The spindle device 18 includes a head stock incorporating a rotary motor and other components, and a spindle 19 mounted on the head stock. The spindle 19 is equipped with a chuck 32 and/or a collet configured to detachably hold the raw workpiece, so that the raw workpiece to be retained by the spindle 19 can be replaced with another one as appropriate. In addition, the spindle 19 and the chuck 32 are rotated about a rotation axis extending along a horizontal direction (Z axis direction).

The tail stock 24 is opposed to the spindle 19 in the Z axis direction, and configured to support the other end of the raw workpiece retained by the spindle 19. The tail stock 24 is movable along the Z axis direction to approach and depart from the raw workpiece.

The tool post 20 is a tool-retaining device configured to retain the tool 26. The tool post 20 is movable along the X axis; i.e., a direction parallel to an axis of the raw workpiece. Further, the tool post 20 is also movable to advance and retreat along a direction parallel to the X axis; i.e., along a radial direction of the raw workpiece. It should be noted that as can be seen from FIG. 1, the X axis is inclined relative to the horizontal direction in such a manner that the X axis is displaced higher as it approaches a deeper region of the machining chamber 13 when viewed from the opening of the machining chamber 13.

An end surface of the tool post 20 is equipped with the turret 22 capable of retaining a plurality of tools 26. The turret 22 has a polygonal shape as viewed along the Z axis direction, and is configured to rotate about an axis parallel to the Z axis. The turret 22 has, on its circumferential surface, a plurality of tool-mounting portions 34 on which the tools 26 or tool holders can be mounted. Then, the tool 26 to be used for machining can be switched to another one of the tools 26 by rotating the turret 22. The tools 26 retained on the turret 22 may include a turning tool (also referred to as a "bite") used for a turning process and a rotating tool (also referred to as an "end mill") used for a rotating cutting process. The tools 26 are mounted directly, or indirectly via the tool holder, on the turret 22. It should be noted that as a general rule the rotating tool is only mountable onto a specific tool-mounting portion 34. The rotating tool mounted on the specific tool-mounting portion 34 is configured to receive rotation force from a motor incorporated in the tool post 20. In addition, the turret 22 in this example further includes a first flow channel 44 through which the cooling liquid flows and a first connector 42 disposed on an entrance of the first flow channel 44. The first flow channel 44 and the first connector 42 (which are not illustrated in FIG. 1 or FIG. 2) will be described further below.

The tools 26 retained by the turret 22 are moved along a direction parallel to the Z axis when the tool post 20 is moved along the direction parallel to the Z axis. In addition, when the tool post 20 is moved along a direction parallel to the X axis, the tools 26 retained by the turret 22 are moved along the direction parallel to the X axis. Then, a cutting depth or other parameters for cutting the raw workpiece with the tool 26 can be changed by moving the tool post 20 along the direction parallel to the X axis.

The machining chamber 13 further includes an in-machine robot 28 configured to function as a part of the cooling liquid feeder. The in-machine robot 28 is a multi-degree-of-freedom robot installed on the inside of the machining chamber 13 and implemented as an articulated robot in which a plurality of robot arms are connected via joints. In this example, the in-machine robot 28 is installed on a top surface of the machining chamber 13, while an installation site and a configuration of the in-machine robot 28 may be varied as appropriate as long as the in-machine robot 28 has a capability of accessing the below-described first connector 42. For example, the in-machine robot 28 may be installed on a wall surface of the machining chamber 13, on the spindle, or on other components.

The in-machine robot 28 is equipped with an end effector 36. The end effector 36 in this example is a component for relaying the cooling liquid, and a second connector 46 is attached to an end face of the end effector 36. The second connector 46 is configured to be mountable, in a liquid tight and detachable manner, onto the first connector 42 which is attached to the turret 22. The second connector 46 is connected to a second flow channel 48. The second flow channel 48 is a flow passage for allowing a cooling liquid source 50 to communicate with the second connector 46. There is no specific limitation to the form of the second flow channel 48 other than a feature that the cooling liquid can flow through the second flow channel 48. For example, the second flow channel 48 may include a tube which is drawn from the in-machine robot 28 to the outside as shown in FIG. 1 and FIG. 2. Alternatively, in another form, the second flow channel 48 may be defined to pass through the inside of the in-machine robot 28. Meanwhile, a cover or other parts for protecting the second flow channel 48 may be installed in order to prevent the second flow channel 48 from becoming intertwined or interfering with another component and thus damaging the other component.

The cooling liquid source 50 supplies the cooling liquid (also referred to as a "cutting oil" or a "coolant") used for cooling the tool 26 and the workpiece. In addition to containing a large amount of the cooling liquid, the cooling liquid source 50 also includes a pump to pump feed the cooling liquid, as well as other components. A valve may be arranged in the cooling liquid source 50 or the second flow channel 48 to allow and interrupt a flow of the cooling liquid. The cooling liquid source 50 may be installed either outside the machine tool 12 or inside the machine tool 12.

A controller 30 is configured to control actuation of each component of the machine tool 12 in accordance with an instruction from an operator. The controller 30 includes, for example, a CPU which performs various calculations, and a memory in which various control programs and control parameters are stored. Further, the controller 30 has a communicating function to transmit and receive various types of data, such as, for example, NC program data, to and from other devices. The controller 30 may further include, for example, a numerical control device which continuously computes positions of both the tool 26 and the raw workpiece. Still further, the controller 30 may be a single device or may be composed of a combination of computing devices.

Figure 3:
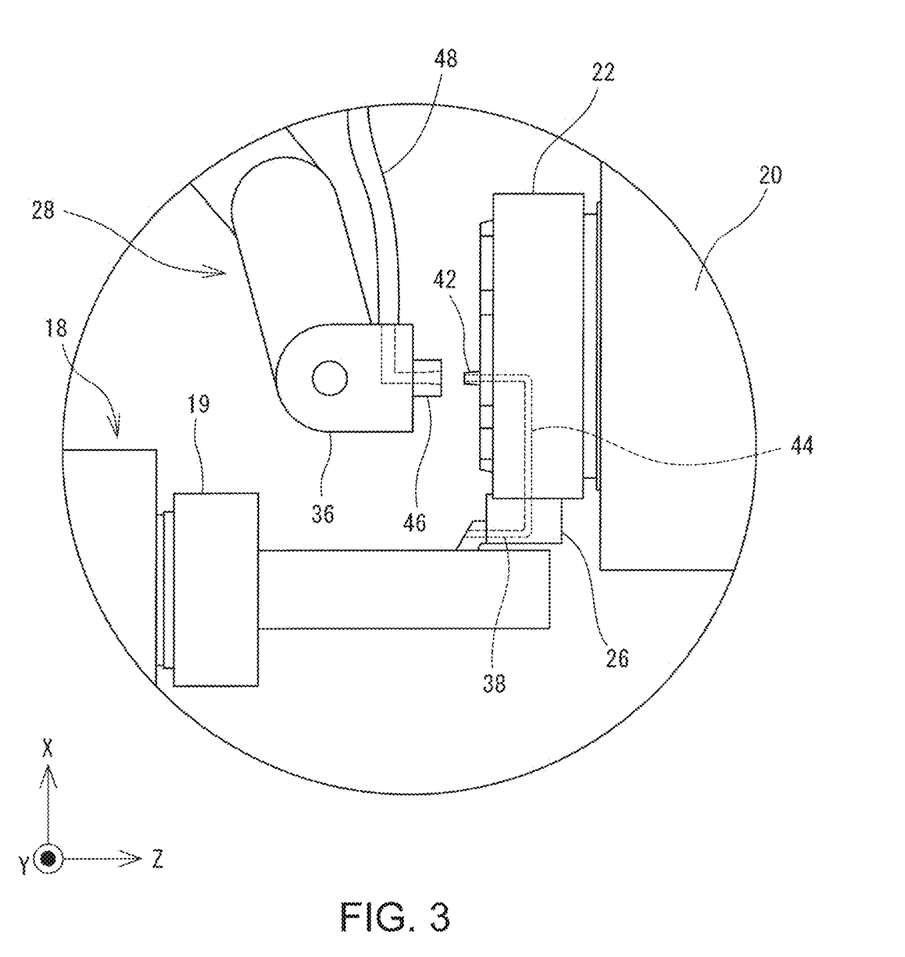
FIG. 3 is an enlarged view of a turret and components around the turret.

The controller 30 controls, for example, movements of the spindle 19, the tool stock 20, and the tail stock 24 during operation of the tool 26 to machine the raw workpiece. In addition, the controller 30 in this example also functions as a controller for the cooling liquid feeder, to control actuation of the in-machine robot 28, various valves, and the pump as needed. Next, operation of feeding the cooling liquid will be described in detail with reference to FIG. 3. FIG. 3 is an enlarged plan view showing the turret 22 and components around the turret 22.

As described above, a plurality of tools 26 may be mounted on the turret 22. The tools 26 to be mounted includes the tool 26 in which a cooling liquid hole 38 is defined. The cooling liquid hole 38 is a through hole which penetrates the tool 26, and through which the cooling liquid flows. The cooling liquid fed into the cooling liquid hole 38 is passed through an inner region of the tool 26 and discharged from the tool 26 to the outside. In the process of passing through the inner region of the tool 26, the cooling liquid causes removal of heat from the tool 26, which can contribute to an increased service life of the tool 26 and improved accuracy in machining with the tool 26. Then, the cooling liquid discharged from the tool 26 is poured onto the workpiece in the vicinity of the machining point. This also causes removal of heat from the workpiece, which can contribute to further improvement in machining accuracy.

Conventionally, it has been necessary that an inner flow channel communicating with the cooling liquid source 50 be formed in both the turret 22 and the tool post 20 in order to feed the cooling liquid into the cooling liquid hole 38 as described above. However, formation of the inner flow channel extending to the cooling liquid source 50 in the turret 22 and other components will cause the turret 22 and other components to be complicated in structure and increased in size.

To avoid such complexity and upsizing, in this specification, a flow channel (the second flow channel 48) communicating with the cooling liquid source 50 is externally arranged in the outside of both the tool post 20 and the turret 22, and the in-machine robot 28 is used for establishing fluid communication between the second flow channel 48 and the cooling liquid hole 38.

Specifically, in this example, the first flow channel 44 and the first connector 42 are disposed in the turret 22 as shown in FIG. 3. The first flow channel 44 is a flow passage for allowing the first connector 42 to be in communication with the cooling liquid hole 38 which is formed in the tool 26 retained by the turret 22. One end of the first flow channel 44 is defined so as to communicate, in a liquid tight manner, with one end of the cooling liquid hole 38 in the tool 26 when the tool 26 is mounted on a predetermined tool-mounting portion 34. The other end of the first flow channel 44 is defined to reach an end surface of the turret 22, and the first connector 42 is attached to the other end of the first flow channel 44.

Figure 4:
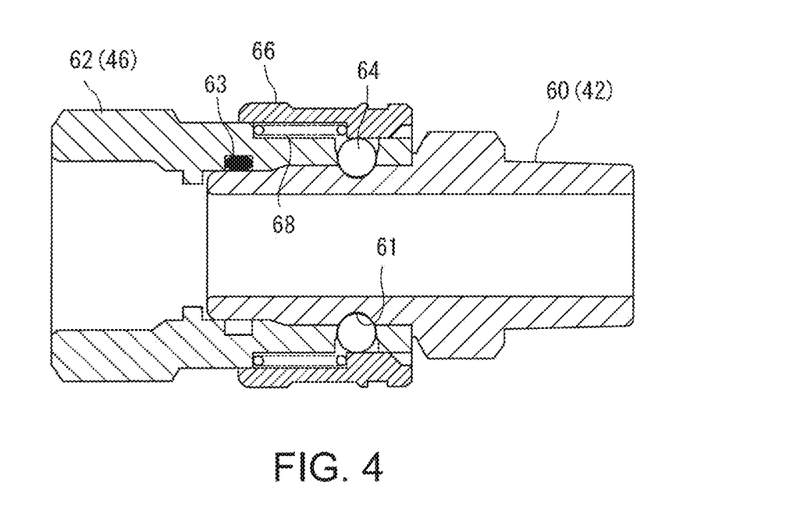
FIG. 4 shows an example of first and second connectors.

The first connector 42 is a fluid connector which can be liquid tightly and detachably attached to the second connector 46 disposed on the in-machine robot 28. Any known fluid connectors can be used for the first and second connectors 42 and 46. In this regard, for example, the first connector 42 and the second connector 46 may be parts of a one-touch fluid coupler as shown in FIG. 4. In this case, for example, the first connector 42 is a plug 60 having an outer circumferential surface on which an engagement groove 61 is formed, while the second connector 46 is a socket 62 which receives insertion of the plug 60. The socket 62 incorporates an O-ring 63 configured to be brought into intimate, liquid tight contact with the outer circumferential surface of the plug 60. Further, the socket 62 is equipped with a steel ball 64 to be fitted in the engagement groove 61 and a sleeve 66 configured to restrict a radial movement of the steel ball 64. When the sleeve 66 is pulled against a biasing force of a sleeve spring 68 toward a proximal end of the socket 62 (the left side of a paper sheet in FIG. 4), the steel ball 64 becomes able to move outward in a radial direction. Then, in this condition, the plug 60 can be pulled out from the socket 62. In this case, the engagement groove 61, the steel ball 64, the sleeve 66, and the sleeve spring 68 cooperatively function as a lock mechanism for locking engagement between the first and second connectors 42 and 46. Further, in this case, the in-machine robot 28 may include a mechanism for releasing the lock mechanism (that is, in particular, a mechanism for pulling the sleeve spring 68 toward the proximal end).

Figure 5:
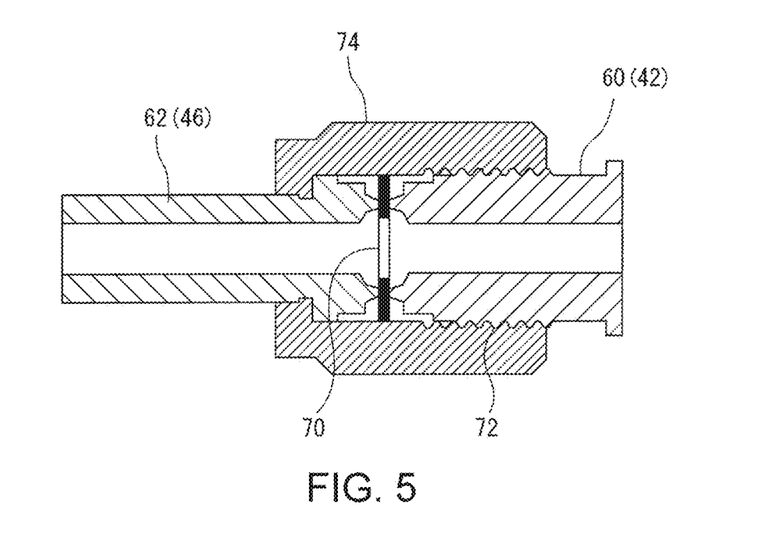
FIG. 5 shows another example of the first and second connectors.

Alternatively, in another form, the first connector 42 and the second connector 46 may be parts of a union type fluid coupling as shown in FIG. 5. In this case, for example, the first connector 42 is a plug 60 having an outer circumferential surface which is threaded to form a male screw 72, and the second connector 46 is a socket 62 which is connected via a union nut 74 to the plug 60. The union nut 74 includes, on its inside, a gasket 70 which is held between tip ends of the socket 62 and the plug 60. Further, the union nut 74 to be screwed on the male screw 72 of the first connector 42 is attached to the outer circumference of the socket 62, so that the plug 60 can be advanced and retreated in an axial direction by rotating the union nut 74. In this case, the male screw 72 and the union nut 74 cooperatively function as the lock mechanism for locking engagement between the first and second connectors 42 and 46. In this case, the in-machine robot 28 may also include the mechanism for releasing the lock mechanism (that is, in particular, a mechanism for rotating the union nut 74 in a loosening direction thereof).

In the above description, the first and second connectors 42 and 44 have the locking mechanism for preventing separation thereof, while the lock mechanism may not necessarily be provided to the first and second connectors 42 and 44. Therefore, the first and second connectors 42 and 46 may be components, one of which is simply press-fitted into the other. For example, the first and second connectors 42 and 46 may be lure connectors having tapered tip ends and may be fluid tightly coupled with each other by press fitting one of the tapered tip ends into the other. This form can obviate the necessity to install any lock releasing mechanism in the in-machine robot 28, and thus contribute to simplification in structure.

The second connector 46 is, as described above, connected to the cooling liquid source 50 via the second flow channel 48. Therefore, connection of the second connector 46 to the first connector 42 can enable the cooling liquid hole 38 to communicate through the first flow channel 44, the first connector 42, the second connector 46, and the second flow channel 48 with the cooling liquid source 50.

To feed the cooling liquid into the cooling liquid hole 38, the controller 30 actuates the in-machine robot 28 to connect the second connector 46 disposed on the end effector 36 to the first connector 42 disposed on the turret 22. Then, after the first and second connectors 42 and 46 are liquid tightly connected to each other, the controller 30 actuates the pump installed in the cooling liquid source 50 to deliver the cooling liquid into the cooling liquid hole 38.

Here, the above-described feeding of the cooling liquid is mainly performed in a time period in which the workpiece is machined by the tool 26. During the machining of the workpiece, the position of the tool 26 and thus the position of the turret 22 are gradually shifted. For this reason, the controller 30 causes the in-machine robot 28 to follow movement of the tool 26 in order to prevent separation of the second connector 46 from the first connector 42.

As is apparent from the above description, the cooling liquid is, in this example, fed through the second flow channel 48 arranged outside of both the turret 22 and the tool post 20, and the second connector 46 arranged in the in-machine robot 28, into the cooling liquid hole 38 in the tool 26. For this reason, the turret 22 and the tool post 20 do not have to include any inner flow channel extending to the cooling liquid source 50, which can allow the turret 22 and the tool post 20 to be simplified in structure and reduced in size.

It should be noted that although, in this example, the first flow channel 44 is formed in the inside of the turret 22, a length of the first flow channel 44 is far shorter than any conventional inner flow channels. In addition, the conventional inner flow channels have been formed in both the tool post 20 and the turret 22 which is rotated relative to the tool post 20. Because of this, it has conventionally been necessary that an arrangement should be formulated to prevent the inner flow channel from becoming broken or twisted when the turret 22 is rotated, resulting in complication of the inner flow channel and the turret 22. On the other hand, in this example, because the first flow channel 44 is defined to stay within the turret 22, the first flow channel 44 and the turret 22 can be simplified in structure as opposed to conventional structure.

Figure 6:
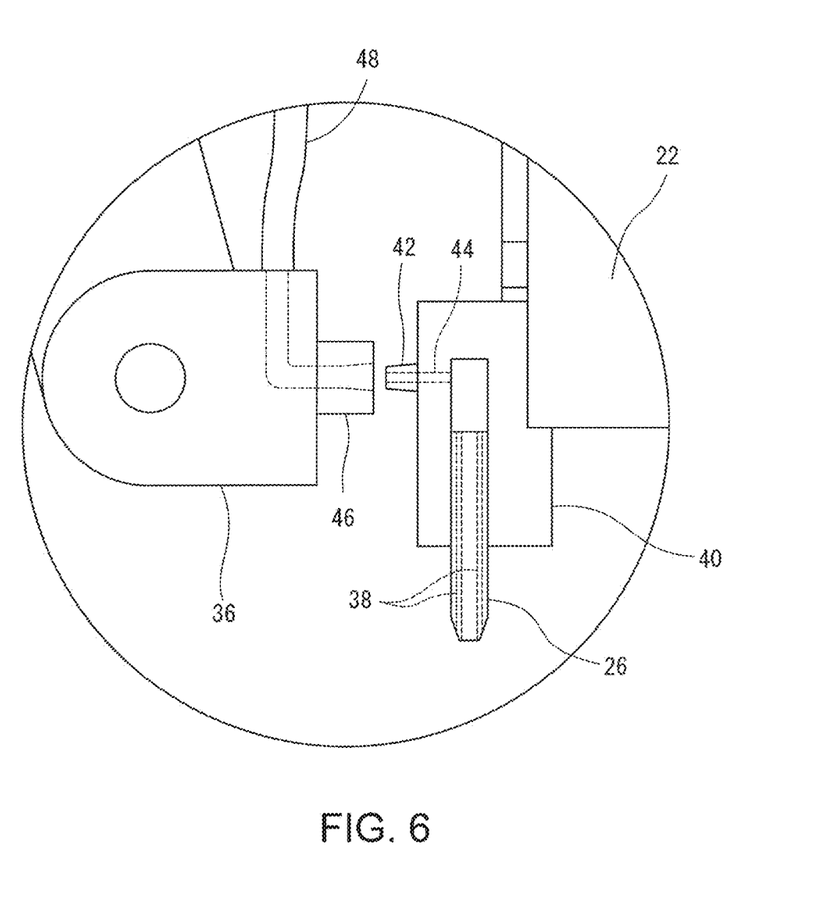
FIG. 6 shows an example of another cooling liquid feeder.

The above-described forms and configurations are presented by way of illustration, and may be modified or changed as appropriate as long as the cooling liquid feeder includes the second connector 46 disposed on the end effector 36 of the in-machine robot 28, the second flow channel 48 for establishing fluid communication between the second connector 46 and the cooling liquid source 50, the first connector 42 which can be attached to and detached from the second connector 46, and the first flow channel 44 for establishing fluid communication between the first connector 42 and the cooling liquid hole 38. For example, the first flow channel 44 and the first connector 42, which are provided to the turret 22 in the above-described example, may be provided to another component. For example, in a case where the tool 26 is mounted through the tool holder 40 on the turret 22 as shown in FIG. 6, the first flow channel 44 and the first connector 42 may be provided to the tool holder 40. When the first flow channel 44 is formed, as described above, without passing through the tool-retaining devices (the turret 22 and the tool post 20), formation of the flow channel inside the tool-retaining devices can be obviated. As a result, it becomes possible to utilize any existing tool retaining devices without change, so that design modifications are no longer required. For example, an existing machine tool 12 can be configured to feed the cooling liquid into the cooling liquid hole 38 of the tool 26 by additionally installing the in-machine robot 28, the second flow channel 48, and the cooling liquid source 50 and using a specific tool holder 40.

Figure 7:
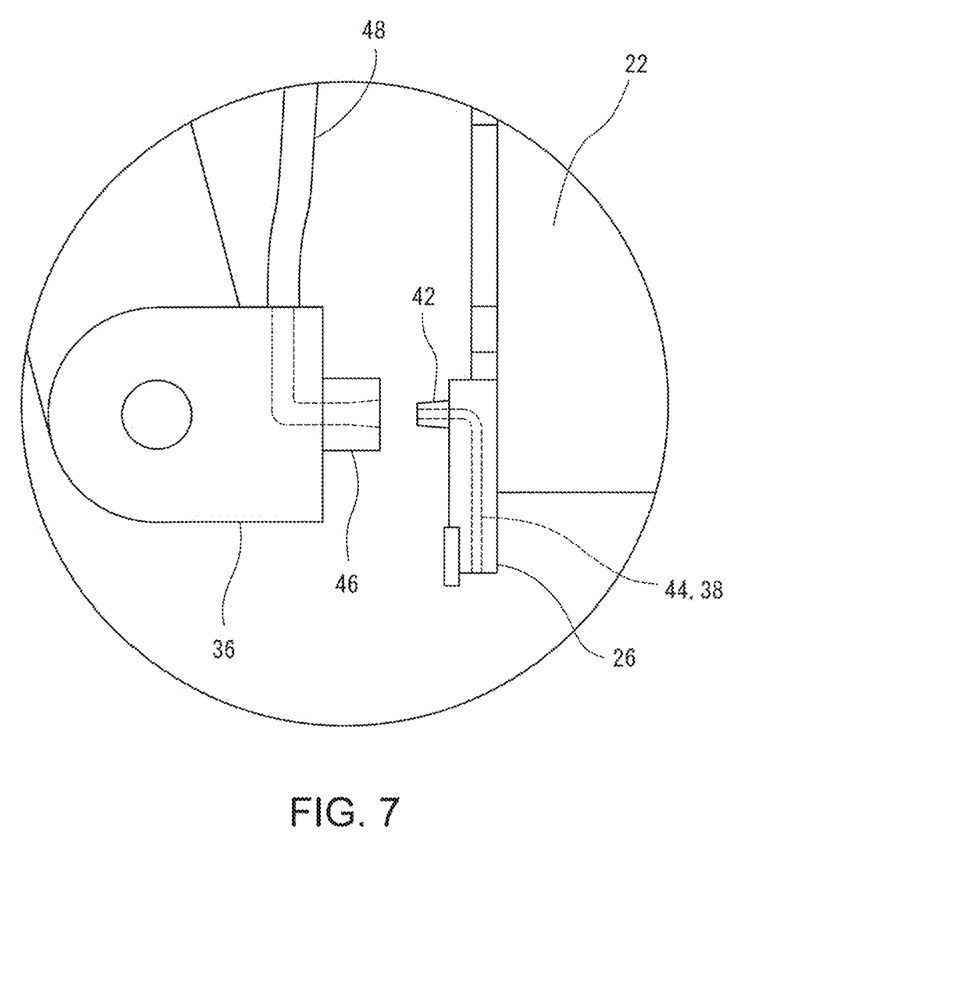
FIG. 7 shows another example of the other cooling liquid feeder.

Further, in another embodiment as shown in FIG. 7, the first flow channel 44 and the first connector 42 may be provided to the tool 26 itself. Also, in this embodiment, because the first flow channel 44 does not pass through the tool-retaining devices (the turret 22 and the tool post 20), it is possible to use existing tool-retaining devices without change. Further, in this embodiment, a part of the cooling liquid hole 38 functions as the first flow channel 44. For this reason, as distinct from the structures illustrated in FIG. 3 and FIG. 6, a connection structure for connecting the cooling liquid hole 38 to the first flow channel 44 is no not needed, which can allow further simplification of the structure of the cooling liquid feeder, and accordingly helps reduce the possibility that liquid leakage will occur.

Figure 8:
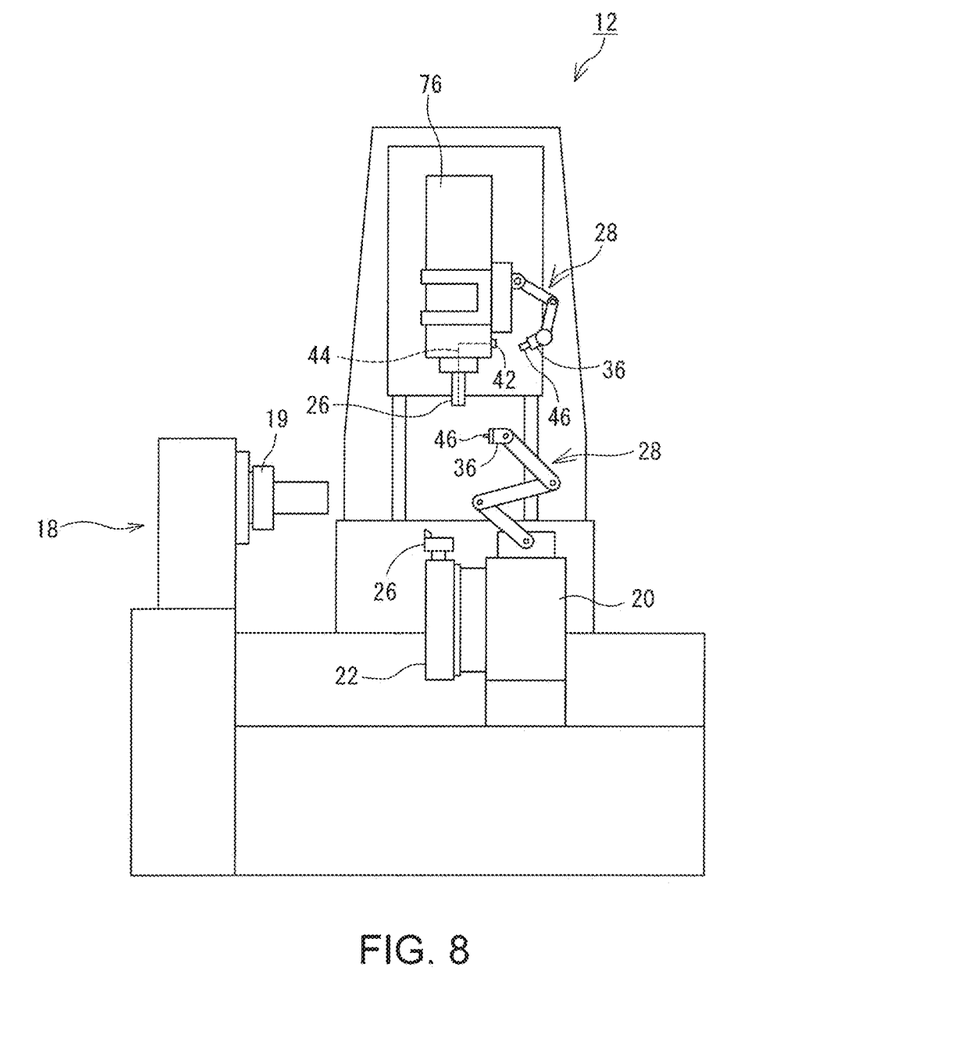
FIG. 8 shows an example of a multi-tasking machining tool incorporating the cooling liquid feeder.

In the above description, the example has been explained, in which the cooling liquid feeder is incorporated into the turning center for turning the workpiece, while the cooling liquid feeder disclosed herein may be incorporated into other machine tools. For example, the cooling liquid feeder may be incorporated into a machining center which is equipped with a spindle head for rotatably supporting the tool 26, and is configured to mill a workpiece. Further, in another embodiment, the cooling liquid feeder may be incorporated, as shown in FIG. 8, into a multi-tasking machining tool equipped with a spindle head 76 and the tool post 20. Here, the first connector 42 and the first flow channel 44 may be provided to the spindle head 76 for rotatably retaining the tool 26, in order to feed the cooling liquid into the cooling liquid hole 38 of the tool 26 which is retained on the spindle head 76. It should be noted that the second flow channel 48 and the cooling liquid source 50 are not illustrated in FIG. 8.

The in-machine robot 28 is not limited to the placement position on a stationary member whose position is unchanged (such as, for example, a top surface of the machining chamber 13), and may be installed on a movable member. In particular, as shown in FIG. 8, the in-machine robot 28 may be installed on the tool-retaining device (such as the tool post 20 or the spindle head 76) configured to retain the tool 26. Installation of the in-machine robot 28 onto the tool-retaining device can facilitate operation of causing the end effector 36 and thus the second connector 46 to follow movement of the tool 26.

The number of sets of the first connector 42, the second connector 46, the first flow channel 44, and the second flow channel 48 to be arranged in one machine tool 12 is not limited to one, and two or more sets may be arranged in one machine tool 12. In particular, there may be machine tools 12 equipped with a plurality of tool-retaining devices, such as the multi-tasking machining tool as shown in FIG. 8, and a turning center equipped with an upper tool post and a lower tool post. In the machine tools 12 equipped with the plurality of tool-retaining devices, multiple sets of the first connector 42, the second connector 46, the first flow channel 44, and the second flow channel 48 may be arranged, and the cooling liquid may be simultaneously fed into two or more tools 26 retained on different tool-retaining devices.

Meanwhile, the end effector 38 mounted on the in-machine robot 28 may be configured to be exchangeable as appropriate. Therefore, an end effector 36 capable of holding the workpiece may be mounted on the in-machine robot 28 for allowing the in-machine robot 28 to transport the workpiece before and after machining operation, while another end effector 36 including the second connector 46 may be mounted on the in-machine robot 28 to feed the cooling liquid into the tool. Further, two or more end effectors 36 may be mounted on one in-machine robot 28. In addition, the second connector 46 may not necessarily be attached to the end effector 38 and may be attached to a main body of the in-machine robot 28.

REFERENCE SIGNS LIST 12 machine tool, 13 machining chamber, 14 cover, 16 door, 18 spindle device, 19 spindle, 20 tool post, 22 turret, 24 tail stock, 26 tool, 28 in-machine robot, 30 controller, 32 chuck, 34 tool-mounting portion, 36 end effector, 38 cooling liquid hole, 40 tool holder, 42 first connector, 44 first flow channel, 46 second connector, 48 second flow channel, 50 cooling liquid source, 60 plug, 61 engagement groove, 62 socket, 63 O-ring, 64 steel ball, 66 sleeve, 68 sleeve spring, 70 gasket, 72 male screw, 74 union nut, 76 spindle head.

The invention claimed is:

1. A cooling liquid feeder for feeding a cooling liquid into a cooling liquid hole defined in a tool, the cooling liquid feeder comprising:
   a first connector disposed on a tool-retaining device, the tool-retaining device being a turret;
   a first flow channel defined to direct the cooling liquid from the first connector to the cooling liquid hole, at least part of the first flow channel passing inside the tool-retaining device;
   a robot which is installed in a machining chamber, is equipped with an end effector, and is of an articulated arm robot type with a plurality of joints constituting a robot arm;
   a second connector disposed on the end effector, the second connector being configured to be attachable and detachable to and from the first connector in a liquid tight manner; and
   a second flow channel which is defined to direct the cooling liquid from a source of the cooling liquid to the second connector, and is defined without passing through an inside of the tool-retaining device; wherein
   the robot is actuated to attach the second connector to the first connector for feeding the cooling liquid into the cooling liquid hole.

2. The cooling liquid feeder according to claim 1, further comprising:
   a controller configured to control actuation of the robot, wherein
   the controller controls actuation of the robot in such a manner that the robot causes the second connector to move following movement of the tool.

3. The cooling liquid feeder according to claim 1, wherein:
   the robot is installed on the tool-retaining device, and moved together with the tool-retaining device.

* * * * *